Robert A. Sauder
William H. Christopher, Jr.
Merrill E. Bailey
INVENTORS

BY William S. Dorman
ATTORNEY

United States Patent Office 3,432,991
Patented Mar. 18, 1969

3,432,991
METHOD AND APPARATUS FOR TREATING FLUID STREAMS CONTAINING GAS, WATER AND WATER-IN-OIL EMULSIONS
Robert A. Sauder, Emporia, Kans., and William H. Christopher, Jr., Tulsa, and Merrill E. Bailey, Oklahoma City, Okla., assignors to Sauder Tank Company, Inc., Emporia, Kans., a corporation of Kansas
Filed Apr. 10, 1967, Ser. No. 631,114
U.S. Cl. 55—42    8 Claims
Int. Cl. B01d *17/04, 19/00*

ABSTRACT OF THE DISCLOSURE

An elongated vessel having separate gas-separating and emulsion-treating zones with a confined and separate heating zone contained within the gas-separating zone for heating the emulsion only.

Background of invention

The present invention relates to a method and apparatus for separating the individual components, namely, gas, water and oil from a fluid stream containing gas, a water-in-oil emulsion and some free water. In certain of the prior art systems employed for this same general purpose, the mixture is heated to break up the emulsion; in other prior art systems a high-voltage electrostatic fluid is implosed upon the emulsion to cause coalescence; finally, many prior art systems employ a combined heating and electrical treatment. With particular regard to those prior art systems where heating is employed, it should be noted that the entire liquid influent (including free water) is generally subjected to the heating action; however, the heat which is added to the free water can be considered as wasted unless some means is provided to recover this heat.

The present invention

Briefly stated, the present invention involves heating the emulsion while minimizing any heat imparted to the free water thereby decreasing the fuel costs and increasing the efficiency of the overall operation. More particularly, the present invention includes a separate and confined heating zone which is substantially entirely immersed within the emulsion phase in the gas-separating zone. Preferably, the heating zone is located near the liquid discharge end of the gas-treating zone.

The emulsion is introduced into the upper portion of the heating zone adjacent one end thereof and withdrawn from the lower portion thereof adjacent the opposite end thereof. Although some heat will be transmitted outwardly from the exterior of the heating zone to the surrounding emulsion, the main transfer of the heat from the heat source is to the emulsion as it passes through the confined heating zone. Relatively little heat is transferred to the free water. The hot emulsion is discharged directly into the emulsion-treating zone. In the latter zone are maintained an upper gas layer, an intermediate layer containing water-free oil and some emulsion, and a lower layer of free water.

The intermediate layer preferably includes, adjacent the upper end thereof, an electrostatic precipitator. The hot emulsion is introduced into the intermediate layer adjacent the lower end thereof so as to move upwardly towards the electrical field. Water-free oil is withdrawn from the upper level of the intermediate layer; water is discharged from the lower water layer; and gas is withdrawn from the upper gas layer, preferably from the gas-treating zone.

Therefore it is a principal object of the present invention to provide a method and apparatus of the type referred to above, wherein the heating requirements are minimized.

Other and further objects and advantageous features of the present invention will hereinafter more fully appear in connection with a detailed description of the accompanying drawings, in which FIGURE 1 is a longitudinal sectional view through a separator constructed in accordance with a preferred embodiment of this invention;

Figure 1:
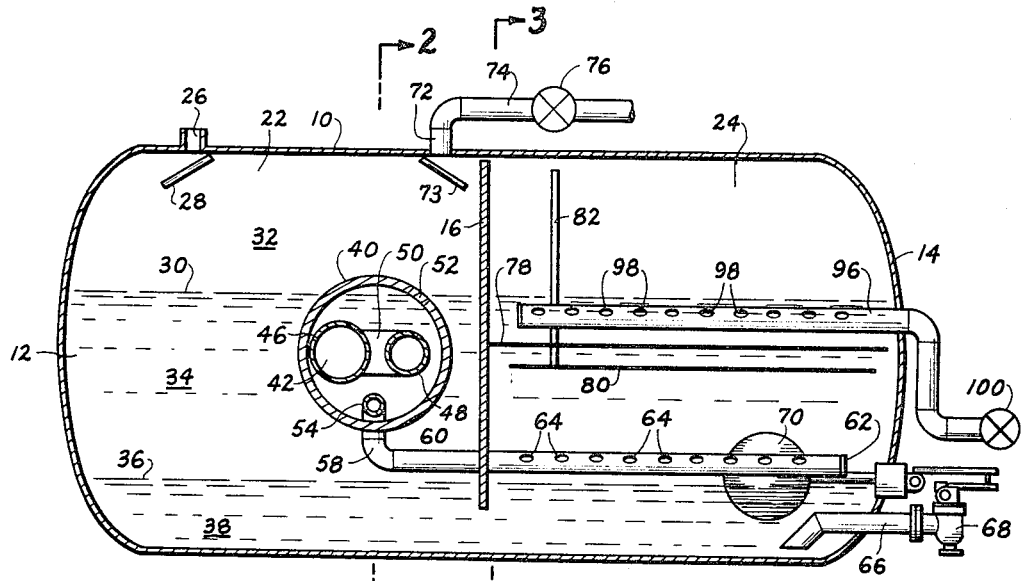

Referring to the drawings in detail, in which like reference numerals are assigned to like elements in the various views, there is shown an elongated cylindrical tank or vessel 10 with dished heads 12 and 14 closing the opposite ends thereof. A substantially circular partition 16 extends transversely across the vessel 10 at a location approximately midway with respect to the length of the vessel. The upper end of the partition 16 is provided with a semi-circular opening 18 to permit equalization of gas pressures as will hereinafter appear. The lower end of the plate 16 terminates at the horizontal edge 20 spaced above the bottom of the vessel 10 and forming therewith a segmental opening.

Referring now to FIGURE 1, and primarily for purposes of identification, the interior of the vessel 10 to the left of the partition 16 will be defined as a gas separating zone 22; also, and primarily for purposes of identification, the interior space within the vessel 10 to the right of the partition 16 will be referred to as an emulsion treating zone 24. A fluid stream can be introduced to the gas separating zone 22 through the inlet 26. This fluid stream, generally under pressure, will include various gaseous and liquid components; the stream entering through the inlet 26 will be deflected by the baffle 28 so as to impinge against the head 12. At this point, the inlet stream will separate into a gaseous component, a water-in-oil emulsion and free water. Thus, within the vessel 10 there will be a gas-liquid interface 30 between the gas 32 and the emulsion 34; similarly there will be a liquid-liquid interface 36 between the emulsion 34 and the free water 38.

Figure 2:
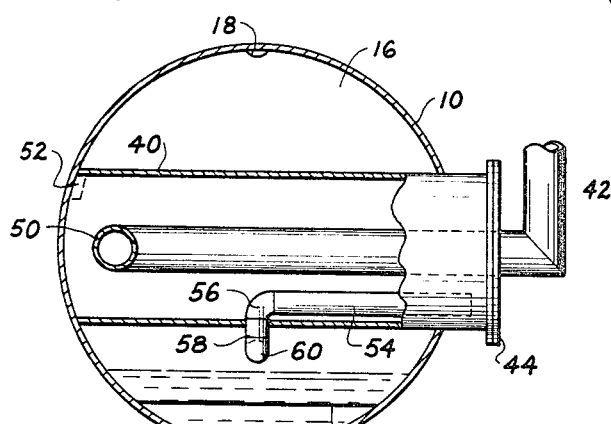
FIGURE 2 is a transverse sectional view taken along section line 2—2 of FIGURE 1.

A cylindrical shell 40 enclosing a furnace or burner 42 extends transversely across the vessel 10 adjacent the partition 16. Referring now to FIGURE 2, the left-hand end of the shell 40 can be secured to the interior of the vessel 10 by welding or the like, whereas the right-hand end of the shell 40 extends outwardly from the vessel. At the point of its emergence from the vessel 10 the shell 40 is welded to the vessel. The right hand end of the shell 40 is closed by circular end plate 44. The plate 44 will have suitable holes therein adapted to receive the tubes 46 and 48 of the furnace 42. The tubes 46 and 48 connect together at their remote ends by means of the bend 50. The shell 40 is provided with an opening 52 adjacent its upper left hand end (FIGURE 2). An outlet pipe 54 extends horizontally to the right within the shell 40, thus providing an outlet at the lower right hand end of the shell. As clearly shown in FIGURE 1, the fluid stream inlet 26 is located adjacent the left-hand end of the gas separating zone 22, whereas the opening 52 is located adajcent the right-hand end, or opposite end, of this zone.

The outlet pipe 54 connects, by means of elbows 56 and 58, through the shell 40 with horizontal pipe 60. The horizontal pipe 60 extends through a suitable opening in the partition 16 and into the emulsion treating zone 24. The right hand end 62 (FIGURE 1) of the horizontal pipe 60 is closed, but the portion of the pipe 60 extending within the zone 24 is provided with a plurality of holes or perforations 64 extending in horizontally spaced relation along the length of the pipe 60. A similar set of holes or perforations (not shown) would be disposed on the opposite side of the pipe 60 from that shown in FIGURE 1 and these holes or perforations would be preferably staggered with respect to the holes 64 shown. A water outlet pipe 66 communicates with the interior of the vessel 10 adjacent the bottom thereof and connects with an external valve 68 which is operated in response to the level of a float 70 in a conventional manner. The float 70 rises and falls with the change in level of the interface 36 between the free-water 38 and the emulsion or oil.

The vessel 10 is provided with a gas outlet 72 which connects with the gas separating zone 32 above the baffle 73. A conduit 74 connects with the gas outlet 72 and with a valve 76 which can be operated in any well known manner, preferably automatically.

Figure 3:
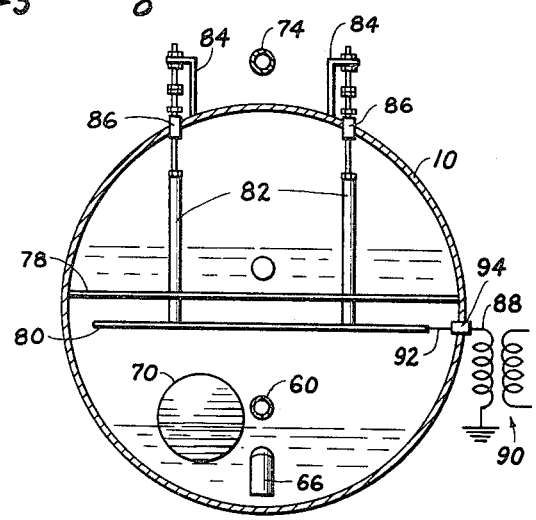
FIGURE 3 is a transverse sectional view taken along section line 3—3 of FIGURE 1.

The emulsion treating zone 24 is provided with a fixed electrical grid 78 which extends horizontally across the vessel 10 as best shown in FIGURE 3 and which also connects at its left hand end (FIGURE 1) with the partition 16. The grid 78 will be considered as the grounded grid. A lower grid 80 is supported by non-conducting bars 82 (preferably made of Teflon) which connect at their outer ends to exterior supporting members 84. The bars 82 (or the outward extensions thereof) are sealed with respect to the vessel 10 by means of adaptors 86. The lower grid 80 is the "hot" grid and connects with a high-voltage terminal 88 of a transformer 90 by means of the conductor 92 which extends through the insulating bushing 94.

The emulsion treating zone 24 is also provided with an oil outlet in the form of the horizontal pipe 96 which is sealed at its left hand end but which is provided with a plurality of holes 98. The pipe 96 connects, exteriorly of the vessel, with a suitable oil discharge valve 100 which can be operated in any conventional manner.

Figure 4:
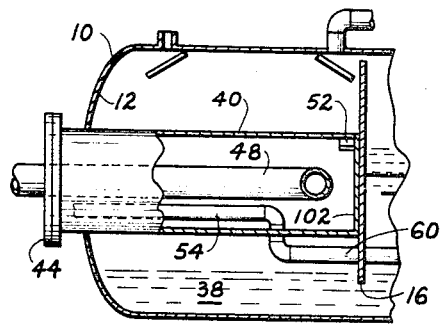
FIGURE 4 is a partial longitudinal sectional view showing a modified form of the present invention.

In the embodiment shown in FIGURE 4 the cylindrical shell 40 is disposed substantially longitudinally with respect to the vessel 10 instead of transverse as shown in FIGURE 1; it should be understood that the right hand portion (not shown) of the vessel 10 would be the same as that shown in FIGURE 1. The portion of the shell 40 which extends outwardly from the vessel 10 would extend through the head 12 and would be welded thereto instead of through the side of the vessel 10 as shown in FIGURE 2. Also the interior end of the shell 40 would not be sealed against the side of the vessel 10 as shown in FIGURE 2 but would be closed off by a circular plate 102 or, in the alternative, the interior end could be sealed against the partition 16 by welding if desired. The outlet pipe 54 would be substantially parallel to the pipe 60 in the embodiment of FIGURE 4. As was the case in connection with FIGURE 1, FIGURE 4 shows the fluid stream inlet and the opening 52 being located at the opposite ends of the gas separating zone.

*Operation*

The operation of the embodiment shown in FIGURES 1 to 3 will now be briefly set forth. A fluid stream (such as from a high pressure separator, not shown) is introduced to the vessel 10 through the inlet 26; the stream is deflected by the baffle 28 and impinges against the head 12. At this time, gas will separate from the stream and occupy the gas zone 32. A certain amount of free-water will fall into the lower water layer 38. Between the water layer 38 and the gas 32 there will be a lighter liquid layer which will be essentially in the form of a water-in-oil emulsion. The emulsion will move towards the right, pass through the opening 52 and into the interior of the shell 40. The emulsion will pass (with respect to FIGURE 2) downwardly and towards the right around the furnace 42. In its passage through the shell 40 the emulsion will be heated thereby tending to break up the same and knock out additional free water. The heated emulsion will pass out through the pipe 54 and into the pipe 60. Since the emulsion is lighter than the free water 38, the emulsion will tend to spread out laterally and upwardly from the holes 64 and will, therefore, move towards the grids 78 and 80. The electrostatic field created by the grids 78 and 80 will tend to cause the emulsion to coalesce, thus causing particles of water to drop downwardly through the emulsion and into the water layer 38. In this manner, the liquid adjacent the gas-interface in the upper portion of the zone 24 will be essentially pure oil or pure hydrocarbon. The thus-purified oil or hydrocarbon will enter the holes 98 in the pipe 96 and will pass out the pipe 96 through the valve 100. The float 70 which rests on the interface between the free water and the emulsion will control the discharge of free water from the pipe 66 and the valve 68. Gas will be taken from the pipe 74 and through the valve 76.

The arrangement shown in FIGURES 1 to 3 has the advantage that most of the free water which is knocked out in the zone 22 need not be heated by the furnace 42. Thus, there is a resulting savings in fuel costs. The heat is transferred principally to the emulsion within the confines of the shell 40.

The embodiment shown in FIGURE 4 is designed to take care of a fluid stream where the density of the hydrocarbon more closely approaches the density of water. It may also be generally true that this fluid stream will have less free water associated therewith. Although the emulsion passing through the shell 40 will be heated directly by the furnace tubes 46 and 48, a certain amount of heat will be transmitted outwardly from the shell 40 to the main body of emulsion within the zone 22. By arranging the shell 40 in a longitudinal direction as in FIGURE 4, the heat transferred from the shell 40 to the main body of emulsion is maximized thereby increasing the amount of free water which will be knocked out of the emulsion in the zone 22.

Whereas the present invention has been described in particular relation to the drawings attached hereto, it should be understood that other and further embodiments, apart from those shown or suggested herein, may be made within the spirit and scope of this invention.

What is claimed is:

1. A method of separating gas, water and oil from a gas-containing water-in-oil emulsion in a closed container having gas-separating and emulsion-treating zones therein spaced from each other; which method includes the steps of introducing into one end of said gas-separating zone a stream of fluid containing gas and said water-in-oil emulsion; separating gas, free water and water-in-oil emulsion from said stream in said gas-separating zone so as to establish in said gas-separating zone an upper layer of gas, an intermediate layer of said emulsion, and a lower layer of free water; providing a confined heating zone within said gas-separating zone; introducing said emulsion only into said heating zone at the upper portion thereof and adjacent one end thereof, said emulsion being introduced into said heating zone through an opening located at the opposite end of said gas-separating zone from one said end and at the interface between said layer of gas and said layer of emulsion; heating said emulsion as it passes through said heating zone; withdrawing said emulsion from the lower portion of said heating zone at the opposite end thereof from the point of introduction of said emulsion; maintaining in said emulsion-treating zone an upper layer of gas, an intermediate layer containing oil and water-in-oil emulsion, and a lower layer of free water; introducing the emulsion withdrawn from said heating zone into the lower end of said emulsion-treating zone through a plurality of discharge passages located substantially in the same horizontal plane; said emulsion being discharged outwardly and upwardly from said discharge passages within said intermediate layer; whereby water-free oil will rise to the top of said intermediate layer in said emulsion-treating zone with free water settling downwardly through the upwardly moving emulsion to the bottom of said emulsion-treating zone; withdrawing gas from the upper portion of said gas-separating zone; withdrawing water from the bottom of said emulsion-treating zone; and withdrawing water-free oil from the top of the intermediate layer in said emulsion-treating zone.

2. A method as set forth in claim 1 including the additional step of establishing an electric field in a horizontal stratum within and adjacent the upper portion of said intermediate layer in said emulsion-treating zone.

3. A method as set forth in claim 1 wherein said heating zone extends in a transverse direction with respect to the direction of movement of emulsion in said gas-treating zone.

4. A method as set forth in claim 1 wherein said heating zone extends in a longitudinal direction with respect to the direction of movement of emulsion in said gas-treating zone.

5. Apparatus for separating gas, water and oil from mixtures containing the same comprising an elongated horizontally extending vessel, a partition extending transversely across said vessel between the ends thereof, said partition and said vessel forming a substantially closed gas-separating chamber and a substantially closed emulsion-treating chamber, said gas-separating chamber being provided with means to establish therein an upper layer of gas, an intermediate layer of emulsion and a lower layer of free water, said emulsion-treating chamber being provided to establish an upper layer of gas, an intermediate layer containing oil and water-in-oil emulsion and a lower layer of free water, a closed heating shell extending within said gas-separating chamber, heating means mounted within said heating shell, said heating shell having an upper opening adjacent one end of said shell communicating with one end of said gas-separating chamber at the interface between the ayer of gas and the layer of emulsion, a fluid outlet connected with the lower interior of said shell at the end thereof opposite from said opening, a horizontal conduit extending into said emulsion-treating chamber adjacent the lower end thereof and having therein a plurality of horizontally spaced openings, means connecting said horizontal conduit with said fluid outlet from said heating shell, means for introducing a fluid mixture of gas, water and oil into said gas-separating chamber at the opposite end thereof from said one end, means for withdrawing gas from the upper end of said vessel, means for withdrawing water from the lower portion of said vessel, and means for withdrawing oil from said emulsion-treating chamber adjacent the upper end thereof.

6. Apparatus as set forth in claim 5 including an electrostatic precipitator located in said emulsion-treating chamber above said horizontal conduit and below said oil outlet.

7. Apparatus as set forth in claim 5 wherein said heating shell extends transversely across said vessel adjacent said partition.

8. Apparatus as set forth in claim 5 wherein said heating shell extends longitudinally from one end of said vessel to said partition.

References Cited

UNITED STATES PATENTS

| 2,726,729 | 12/1955 | Williams | 55—174 X |
| 2,783,854 | 3/1957 | Lovelady et al. | 55—175 X |
| 3,207,686 | 9/1965 | Jarvis et al. | 204—302 |
| 3,255,571 | 6/1966 | Walker et al. | 55—174 X |

REUBEN FRIEDMAN, *Primary Examiner.*

R. W. BURKS, *Assistant Examiner.*

U.S. Cl. X.R.

55—175; 204—188, 308